United States Patent
Uchiyama et al.

(10) Patent No.: US 12,155,061 B2
(45) Date of Patent: Nov. 26, 2024

(54) NEGATIVE ELECTRODE ACTIVE MATERIAL FOR SECONDARY BATTERIES, AND SECONDARY BATTERY

(71) Applicant: Panasonic Intellectual Property Management Co., Ltd., Osaka (JP)

(72) Inventors: Yohei Uchiyama, Hyogo (JP); Taisuke Asano, Hyogo (JP); Yosuke Sato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 911 days.

(21) Appl. No.: 17/269,057

(22) PCT Filed: Aug. 23, 2019

(86) PCT No.: PCT/JP2019/032938
§ 371 (c)(1),
(2) Date: Feb. 17, 2021

(87) PCT Pub. No.: WO2020/045256
PCT Pub. Date: Mar. 5, 2020

(65) Prior Publication Data
US 2021/0242453 A1    Aug. 5, 2021

(30) Foreign Application Priority Data

Aug. 30, 2018   (JP) ................... 2018-161779

(51) Int. Cl.
*H01M 10/0525* (2010.01)
*H01M 4/36* (2006.01)
(Continued)

(52) U.S. Cl.
CPC ........... *H01M 4/364* (2013.01); *H01M 4/386* (2013.01); *H01M 4/485* (2013.01);
(Continued)

(58) Field of Classification Search
CPC ...... H01M 4/364; H01M 4/386; H01M 4/485; H01M 10/0525; H01M 10/054; H01M 2004/021; H01M 2004/027
See application file for complete search history.

(56) References Cited

U.S. PATENT DOCUMENTS

| | | | |
|---|---|---|---|
| 2016/0322637 A1 | 11/2016 | Nakanishi et al. |
| 2017/0309950 A1 | 10/2017 | Minami et al. |
| 2018/0342757 A1 | 11/2018 | Choi et al. |

FOREIGN PATENT DOCUMENTS

| | | |
|---|---|---|
| CN | 105849953 A | 8/2016 |
| JP | 2014-187005 A | 10/2014 |

(Continued)

OTHER PUBLICATIONS

International Search Report dated Oct. 8, 2019, issued in counterpart International Application No. PCT/JP2019/032938 (2 pages).
(Continued)

*Primary Examiner* — James Lee
(74) *Attorney, Agent, or Firm* — WHDA, LLP (57) ABSTRACT

A negative electrode active material for a secondary battery includes silicate composite particles each of which contain a silicate phase and silicon particles dispersed in the silicate phase, the silicate phase is an oxide phase containing Si, O, and alkali metals, and the alkali metals include at least K and Li.

11 Claims, 2 Drawing Sheets

(51) Int. Cl.
    *H01M 4/38*         (2006.01)
    *H01M 4/485*      (2010.01)
    *H01M 10/054*     (2010.01)
    *H01M 4/02*         (2006.01)

(52) U.S. Cl.
    CPC ..... *H01M 10/0525* (2013.01); *H01M 10/054* (2013.01); *H01M 2004/021* (2013.01); *H01M 2004/027* (2013.01)

(56) References Cited

FOREIGN PATENT DOCUMENTS

| | | |
|---|---|---|
| JP | 2014-199753 A | 10/2014 |
| JP | 2015-125815 A | 7/2015 |
| JP | 2015-153520 A | 8/2015 |
| JP | 2017-050195 A | 3/2017 |
| WO | 2016/136180 A1 | 9/2016 |
| WO | 2017/209561 A1 | 12/2017 |
| WO | 2019/065766 A1 | 4/2019 |
| WO | 2019/107032 A1 | 6/2019 |
| WO | 2019/131724 A1 | 7/2019 |

OTHER PUBLICATIONS

English translation of Search Report dated Oct. 23, 2023, issued in counterpart CN Application No. 201980032382.7. (3 pages).

NEGATIVE ELECTRODE ACTIVE MATERIAL FOR SECONDARY BATTERIES, AND SECONDARY BATTERY

TECHNICAL FIELD

The present invention relates primarily to an improvement of a negative electrode active material for a secondary battery.

BACKGROUND ART

In recent years, since having a high voltage and a high energy density, a secondary battery has been expected to be used as an electric power source of a compact consumer use, an electric power storage device, and/or an electric car. In an environment in which an increase in energy density of a battery has been pursued, as a negative electrode active material having a high theoretical capacity density, the use of a material containing silicone (Si) which forms an alloy with lithium has been anticipated. In particular, since a material ($SiO_x$) in which fine silicon particles are dispersed in $SiO_2$ can be suppressed from being miniaturized due to expansion and contraction of silicon, much attention has been paid on this material.

However, since having a high irreversible capacity, $SiO_x$ has a problem in terms of a low initial charge/discharge efficiency. In addition, since an amount of silicon to be contained in $SiO_x$ which is synthesized by a vapor phase method is restricted, a material having an x value of approximately 1 may only be obtained, and an increase in capacity is restricted.

Accordingly, the use of composite particles each of which contain a lithium silicate phase containing lithium in advance in an amount corresponding to the irreversible capacity and silicon particles dispersed in the lithium silicate phase has been proposed (Patent Document 1). The silicon particles contribute to a charge/discharge reaction (reversible occlusion and release of lithium). The composite particles each containing the lithium silicate phase and the silicon particles are manufactured by sintering a mixture of a glassy lithium silicate powder and silicon particles at a high temperature and in a high pressure atmosphere. The amount of the silicon particles contained in the composite particle can be arbitrarily controlled by a mixing rate between the lithium silicate powder and the silicon particles.

CITATION LIST

Patent Document

Patent Document 1: Japanese Published Unexamined Patent Application No. 2015-153520

SUMMARY OF INVENTION

In the sintering step, the lithium silicate powder is melted to flow so as to fill voids formed between the silicon particles. As a result, a sea-island structure in which the lithium silicate phase functions as a sea portion and the silicon particles function as island portions is formed. Since a dense sea-island structure is formed, the composite particles are suppressed from being degraded due to expansion and contraction of the silicon particles. That is, in order to improve cycle characteristics of a battery, dense composite particles are required to be formed.

In the sintering step, a decrease in viscosity of the lithium silicate at a sintering temperature is required. In addition, the crystallization of the lithium silicate may be advanced. When the lithium silicate is partially crystallized, the fluidity thereof may be decreased, and the voids formed between the silicon particles may not be sufficiently filled in some cases. As a result, composite particles having voids are generated, and the cycle characteristics of the battery become difficult to sufficiently improve.

In consideration of those described above, one aspect of the present invention relates to a negative electrode active material for a secondary battery, the negative electrode active material comprising silicate composite particles each of which contain a silicate phase and silicon particles dispersed in the silicate phase. In the negative electrode active material described above, the silicate phase is an oxide phase which contains Si, O, and alkali metals, and the alkali metals include at least K and Li.

According to the present disclosure, the crystallization of the silicate in the sintering step is suppressed, and silicate composite particles having a small number of voids can be obtained; hence, a secondary battery excellent in cycle characteristics can be obtained.

DESCRIPTION OF EMBODIMENTS

A negative electrode active material for a secondary battery according to an embodiment of the present disclosure includes silicate composite particles each of which contain a silicate phase and silicon particles dispersed in the silicate phase. In other words, the silicate composite particles each include a silicate phase functioning as a sea portion of a sea-island structure and silicon particles functioning as island portions thereof. The silicate phase is an oxide phase which contains Si, O, and alkali metals. In this embodiment, as the alkali metals, the silicate phase contains at least K and Li.

In general, a glass containing a plurality of alkali metals has a low ion conductivity as compared to that of a glass containing a single alkali metal. The phenomenon as described above is called a mixed alkali effect. Silicate composite particles to be used as a negative electrode active material of a battery are required to have a predetermined ion conductivity. Hence, in the past, a silicate phase containing Si, O, and Li only has been believed to be advantageous.

However, in practice, when the silicate phase contains at least K and Li, various merits can be obtained. As a first merit, a silicate phase containing K and Li can be manufactured at a low cost compared to that in the past. The reasons for this are that the resource of K is abundant, and a raw material thereof is commercially available at a low cost.

As a second merit, the silicate phase containing K and Li is not likely to be crystallized as compared to a silicate phase containing Li only, the viscosity in a molten state is low, and the fluidity is excellent. Accordingly, in a sintering step, voids formed between the silicon particles are likely to be filled, and dense composite particles are likely to be generated.

As a third merit, when the content of the silicon particles contained in the silicate composite particle is increased, and when the rate of the island portions is increased, the flow of the silicate in a molten state is disturbed. Hence, the use of a silicate having an excellent fluidity is further required. Since the silicate containing K and Li is excellent in fluidity, even when the rate of the island portions is high, this silicate is likely to fill the voids formed between the silicon particles. That is, since the silicate containing K and Li is used, dense silicate composite particles having a high capacity are likely to be obtained.

In addition, even when the silicate phase containing K and Li is used, compared to the case in which a silicate phase containing Li only is used, a battery reaction is not disturbed, and a sufficient battery performance can be obtained.

An atomic ratio: K/Li of K to Li contained in the silicate phase may be, for example, 0.1 to 7.1, may be 0.4 to 5, or may also be 0.7 to 2. Since the K/Li ratio is controlled as described above, the merit of Li described above can be sufficiently obtained. In addition, when the K/Li ratio is set to 0.1 or more, the first to the third merits described above are sufficiently enhanced.

In view of reduction in cost, a lower content of expensive Li is more advantageous. However, when the amount of K is increased and the amount of Li is decreased so that the K/Li ratio exceeds 7.1, the viscosity of the silicate phase may not be sufficiently decreased at an arbitrary sintering temperature, and in order to form the dense composite particles, a higher sintering temperature may be required in some cases. When the sintering temperature is increased, the sizes of the silicon particles are liable to be increased, and the expansion and contraction of the silicon particles in charge/discharge are also liable to be increased. As a result, the cycle characteristics may be degraded in some cases. Hence, the K/Li ratio in the silicate phase is preferably in the range described above. When the amount of K is decreased and the amount of Li is increased so that the K/Li ratio is less than 0.1, by the same reason as described above, the first to the third merits described above are hardly obtained.

With respect to the total amount of elements other than O contained in the silicate phase, for example, the content of K is 7 percent by mole or more, the content of Li is 7 percent by mole or more, and the total content of K and Li is 70 percent by mole or less. Since the contents of the elements are set in the ranges described above, a more inexpensive silicate phase excellent in fluidity in a molten state is likely to be obtained. The content of K may be 10 percent by mole or more, may be 15 percent by mole or more, or may also be 20 percent by mole or more. In addition, the content of Li may be 10 percent by mole or more, may be 15 percent by mole or more, or may also be 20 percent by mole or more. In addition, the total content of K and Li may be 60 percent by mole or less, may be 50 percent by mole or less, may be 45 percent by mole or less, or may also be 40 percent by mole or less.

The alkali metals may further include Na. Since at least three types of alkali metals including Li, K, and Na are contained, a silicate phase more excellent in fluidity in a molten state can be generated.

When the silicate phase contains two types or at least three types of alkali metals, among the alkali metals, the total content of alkali metals other than a first alkali metal having a highest content with respect to the total amount of the elements other than O contained in the silicate phase may be, for example, 7 percent by mole or more, may be 10 percent by mole or more, or may also be 15 percent by mole or more. In the case described above, the content of the alkali metals with respect to the total amount of the elements other than O contained in the silicate phase is preferably set to 80 percent by mole or less and may be 70 percent by mole or less, may be 60 percent by mole or less, may be 50 percent by mole or less, may be 45 percent by mole or less, or may also be 40 percent by mole or less.

The silicate phase may further contain a group 2 element. In general, although a silicate phase has an alkali property, the group 2 element has a function to suppress elution of an alkali metal from the silicate phase. Hence, when a slurry containing a negative electrode active material is prepared, a slurry viscosity is likely to be stabilized. A treatment (such as an acid treatment) to neutralize an alkali component of the silicate composite particles is not so much necessary.

As the group 2 element, at least one selected from the group consisting of Be, Mg, Ca, Sr, Ba, and Ra may be used. Among those mentioned above, since a Vickers hardness of the silicate phase is improved, and the cycle characteristics are further improved, Ca is preferable.

With respect to the total amount of the elements other than O contained in the silicate phase, the content of the group 2 element is, for example, 20 percent by mole or less and may be 15 percent by mole or less, may be 10 percent by mole or less, may be 5 percent by mole or less, or may also be 4 percent by mole or less.

The silicate phase may further contain an element M other than those mentioned above. The element M may be at least one selected from the group consisting of B, Al, Zr, Nb, Ta, La, V, Y, Ti, P, Bi, Zn, Sn, Pb, Sb, Co, Er, F, and W. Among those mentioned above, B has a low melting point and is advantageous to improve the fluidity of the silicate in a molten state. In addition, Al, Zr, Nb, Ta, and La each may improve the Vickers hardness while the ion conductivity of the silicate phase is maintained.

In consideration of the fluidity in a molten state, the silicate phase is preferably in an amorphous state in the sintering step. In an X-ray diffraction pattern of the silicate composite particles after the sintering step, a ratio of an integrated value of a diffraction peak of each of all the other elements to an integrated value of a diffraction peak which belongs to the (111) plane of single Si is 0.5 or less and may be 0.3 or less, may be 0.1 or less, or may also be 0 (zero). In addition, the diffraction peak which belongs to the (111) plane of single Si is observed at approximately $2\theta=28°$.

According to the embodiment described above, a void rate of the silicate composite particle is, for example, less than 5 percent by volume and may be set to 3 percent by volume or less or may also be 1 percent by volume or less.

When the void rate is measured, after the silicate composite particles are immersed in a liquid paraffin (such as a paraffin having a specific gravity of approximately 0.85), vacuum decompression is performed, and air in the voids are replaced with the liquid paraffin. Subsequently, from the different in specific gravity before and after the immersion, the void rate is obtained. In particular, an increase in specific gravity depends on the mass of the liquid paraffin which enters the voids. From the mass of the liquid paraffin which enters the voids, the volume of the voids can be calculated. As another measurement method of the void rate, after a cross-section of the silicate composite particle is obtained by a cross-section polisher (CP), an area rate (void rate) of the voids occupied in the cross-section of the composite particle may be obtained by a cross-sectional image analysis using a SEM. For example, after 10 silicate composite particles each having a maximum diameter of 5 μm or more are randomly selected, the void rates thereof are obtained, and an average value of the 10 void rates may be calculated.

Next, the contents of B, Na, K, and Al contained in the silicate phase are quantitatively analyzed in accordance with JIS R3105 (1995) (analysis method of borosilicate glass), and the content of Ca is quantitatively analyzed in accordance with JIS R3101 (1995) (analysis method of soda-lime glass).

The other elements to be contained in the silicate phase may be quantified by the following method. First, a sample of the silicate phase or the silicate composite particle containing the same is completely melted in a heated acid solution (mixed acid of hydrofluoric acid, nitric acid, and sulfuric acid), and carbon which is a residue of the solution is removed by filtration. Next, a filtrate thus obtained is analyzed by an inductively-coupled plasma atomic emission spectrometry (ICP-AES), and a spectral intensity of each element is measured. Subsequently, a calibration curve is formed using a commercially available standard solution of the element, and the content of each element contained in the silicate phase is calculated.

In the silicate composite particle, although the silicate phase and the silicon particles are present, by using Si-NMR, the two components described above can be separately quantitatively measured. The content of Si obtained by ICP-AES as described above indicates the total of the Si amount forming the silicon particles and the Si amount in the silicate phase. On the other hand, the Si amount forming the silicon particles can be separately quantitatively measured using Si-NMR. Hence, when the content of Si obtained by ICP-AES is subtracted by the Si amount forming the silicon particles, the Si amount in the silicate phase can be quantitatively obtained. In addition, as the standard substance necessary for the quantitative determination, a mixture containing a silicate phase and silicon particles, the Si contents of which are each known in advance, at a predetermined rate may be used.

Hereinafter, desired measurement conditions of Si-NMR are shown.

<Si-NMR Measurement Conditions>

Measurement apparatus: manufactured by Varian, Solid-state nuclear magnetic resonance spectroscopy apparatus (INOVA-400)

Probe: Varian 7 mm CPMAS-2
MAS: 4.2 kHz
MAS Rate: 4 KHz
Pulse: DD (45° pulse+signal acquisition time 1H decoupling)
Repetition time: 1,200 to 3,000 seconds
Observation width: 100 KHz
Center of observation: approximately −100 ppm
Signal acquisition time: 0.05 seconds
Number of scans: 560
Sample amount: 207.6 mg The silicate composite particles can be recovered from a battery by the following method. First, after the battery is disassembled, a negative electrode is taken out and washed with anhydrous ethyl methyl carbonate or dimethyl carbonate, so that an electrolyte liquid is removed. Subsequently, a negative electrode mixture is peeled away from copper foil and then pulverized with a mortar, so that a sample powder is obtained. Next, after being dried for one hour in a dry atmosphere, the sample powder is immersed in a weakly boiled 6M hydrochloric acid for 10 minutes, so that alkali metals, such as Na and Li, contained in a binding agent or the like are removed. Subsequently, after being washed with ion-exchanged water, the sample powder is processed by filtration and is then dried at 200° C. for one hour. Next, by firing performed at 900° C. in an oxygen atmosphere to remove carbon components, the silicate composite particles can only be isolated.

A secondary battery according to an embodiment of the present disclosure includes a positive electrode, a negative electrode, an electrolyte, and a separator provided between the positive electrode and the negative electrode, and the negative electrode includes a collector and a negative electrode active material layer. In this embodiment, the negative electrode active material layer contains the negative electrode active material (or the silicate composite particles) for a secondary battery according to the embodiment of the present disclosure. The negative electrode active material layer may also contain another active material (such as a lithium titanium oxide or a carbon material including a graphite).

In a cross-sectional SEM-EDX analysis (scanning electron microscope-energy dispersive X-ray analysis) of the negative electrode active material layer in a discharge state, a ratio: I(K/O) of an intensity which belongs to K to an intensity which belongs to O is, for example, 0.01 to 0.4. In addition, when an atomic ratio: K/Li of K to Li is 0.1 to 7.1 (in particular, 0.7 to 2), in general, the I(K/O) is regarded to be in the range described above. In addition, when the I(K/O) is in the range described above, in general, with respect to the total amount of the elements other than O contained in the silicate phase, the content of K and the content of Li are each regarded to be 7 percent by mole or more. In addition, the intensity which belongs to a predetermined element indicates a net intensity excluding a background, and hereinafter, the intensity will be described in the same manner as described above.

In the cross-sectional SEM-EDX analysis of the negative electrode active material layer in a discharge state, a ratio: I(Ca/O) of an intensity which belongs to Ca to the intensity which belongs to O is, for example, 0.5 or less. In this case, the content of Ca with respect to the total amount of the elements other than O contained in the silicate phase is regarded to be 15 percent by mole or less.

In addition, the discharge state indicates a state in which when a rated capacity of the battery is C, discharge is performed to a charge state (SOC: State of Charge) of 0.05×C or less. For example, the discharge state indicates a state in which discharge is performed at a constant current of 0.05 C to a lower limit voltage.

Hereinafter, desired measurement conditions of the cross-sectional SEM-EDX analysis are shown.

<SEM-EDX Measurement Conditions>

Processing apparatus: manufactured by JEOL, SM-09010 (Cross Section Polisher)
Processing condition: accelerating voltage 6 kV
Current: 140 μa
Degree of vacuum: $1 \times 10^{-3}$ to $2 \times 10^{-3}$ Pa
Measurement apparatus: electron microscope, manufactured by Hitachi, Ltd., SU-70
Accelerating voltage in analysis: 10 kV
Field: free mode
Probe current mode: Medium
Probe current range: High
Anode Ap.: 3
OBJ Ap.: 2
Analysis area: 1 μm square
Analysis software: EDAX Genesis CPS: 20500
Lsec: 50
Time constant: 3.2

In addition, the quantitative determination of each element of the silicate composite particle contained in the negative electrode active material layer in a discharge state may also be performed by, besides the SEM-EDX analysis, an Auger electron spectroscopy (AES), a laser abrasion ICP mass analysis (LA-ICP-MS), an X-ray photoelectron spectroscopy (XPS), or the like.

Since the silicate phase has a poor electron conductivity, the electric conductivity of the silicate composite particle also tends to be low. On the other hand, when an electrically conductive layer is formed using an electrically conductive material to cover the surface of the silicate composite particle, the electric conductivity of the silicate composite particle can be remarkably increased. As the electrically conductive material, an electrically conductive carbon material is preferable. The electrically conductive carbon material preferably contains at least one selected from the group consisting of a carbon compound and a carbonaceous material.

The electrically conductive layer formed using the electrically conductive material is preferably thin so as not to actually influence the average particle diameter of the silicate composite particles. In order to ensure the electric conductivity and in consideration of the diffusivity of lithium ions, the thickness of the electrically conductive layer is preferably 1 to 200 nm and more preferably 5 to 100 nm. The thickness of the electrically conductive layer may be measured by a cross-sectional observation of particles using a SEM or a TEM (transmission electron microscope).

As the carbon compound, for example, there may be mentioned a compound containing carbon and hydrogen or a compound containing carbon, hydrogen, and oxygen. As the carbonaceous material, for example, an amorphous carbon having a low crystallinity or a graphite having a high crystallinity may be used. As the amorphous carbon, for example, a carbon black, a coal, a coke, a charcoal, or an active carbon may be used. As the graphite, for example, a natural graphite, an artificial graphite, or graphitized mesophase carbon particles may be mentioned. Among those mentioned above, since having a low hardness and a high buffer function for the silicon particles, the volume of each of which is changed in charge/discharge, an amorphous carbon is preferable. As the amorphous carbon, a graphitizable carbon (soft carbon) may be used, or a non-graphitizable carbon (hard carbon) may also be used. As the carbon black, for example, acetylene black or Ketjen black may be mentioned.

Next, a method for manufacturing silicate composite particles will be described in detail.

Process (i)

As a raw material of a silicate, a raw material mixture containing a Si raw material, a K raw material, and a Li raw material at a predetermined rate may be used. The raw material mixture may also contain, if needed, a Na raw material, a raw material of the group 2 element, and/or a raw material of the element M. The raw material mixture is melted, and its molten liquid is allowed to pass through metal rollers to form flakes, so that the silicate is formed. In addition, for example, if the productivity of a silicon pulverization step is improved, the silicate in the form of flakes may also be used after being crystallized to increase the hardness. Alternatively, without melting the raw material mixture, the raw material mixture may be fired at a temperature of the melting point or less so as to manufacture the silicate by a solid-state reaction.

As the Si raw material, a silicon oxide (such as $SiO_2$) may be used. As the raw materials of the alkali metals, the group 2 element, and the element M, for example, carbonate salts, oxides, hydroxides, hydrides, nitrate salts, or sulfate salts thereof may be used. Among those mentioned above, for example, the carbonate salts, the oxides, and the hydroxides are preferable.

Process (ii)

Next, a silicon raw material is blended with the silicate to form a composite. For example, through the following steps (a) to (c), the silicate composite particles are formed.

Step (a)

First, a powder of the silicon raw material and a powder of the silicate are mixed, for example, at a mass ratio of 20:80 to 95:5. As the silicon raw material, course silicon particles having an average particle diameter of several to several tens of micrometers may be used.

Step (b)

Next, by using a pulverizing machine, such as a ball mill, the mixture of the silicon raw material and the silicate is pulverized into fine particles while being stirred. Even when the silicate is crystallized, by this pulverization step, the silicate is changed into an amorphous state. In this step, by adding an organic solvent to the mixture, a wet pulverization is preferably performed. A predetermined amount of the organic solvent may be charged at a time at an initial pulverization stage, or the organic solvent may be charged several times in an intermittent manner in the pulverization step. The organic solvent functions to prevent an object to be pulverized from adhering to an inner wall of a pulverization container.

As the organic solvent, for example, an alcohol, an ether, a fatty acid, an alkane, a cycloalkane, a silicate ester, or a metal alkoxide may be used.

After being separately pulverized into fine particles, the silicon raw material and the silicate may be mixed with each other. In addition, after silicon nanoparticles and silicate nanoparticles are formed without using a pulverization machine, those nanoparticles may be mixed with each other. For the formation of nanoparticles, a known method, such as a vapor phase method (such as a plasma method) or a liquid phase method (such as a liquid-phase reduction method) may be used.

Step (c)

Next, for example, in an inert atmosphere (such as an atmosphere of argon or nitrogen), while being pressurized, the mixture in the form of fine particles is sintered by heating at 450° C. to 1,000° C. For the sintering, a hot press device or a sintering apparatus which performs discharge plasma sintering while a pressure is applied in an inert atmosphere may be used. During the sintering, the silicate is melted to flow so as to fill the voids formed between the silicon particles. As a result, a dense block sintered body in which the silicate phase functions as a sea portion and the silicon particles function as island portions can be obtained.

By pulverizing the sintered body thus obtained, the silicate composite particles are obtained. By appropriately selecting the pulverization conditions, silicate composite particles having a predetermined average particle diameter can be obtained. The average particle diameter of the silicate composite particles is, for example, 1 to 20 μm. The average particle diameter of the silicate composite particles indicates a particle diameter (volume average particle diameter) at a volume integrated value of 50% in a volume-basis particle size distribution measured by a laser diffraction scattering method.

Process (iii)

Next, the surfaces of the silicate composite particles may be at least partially covered with an electrically conductive material to form electrically conductive layers. The electrically conductive material is preferably electrochemically stable, and an electrically conductive carbon material is preferable. As a method to cover the surfaces of the silicate composite particles by an electrically conductive carbon material, for example, there may be mentioned a CVD method using a hydrocarbon gas, such as acetylene or methane, as a raw material or a method in which after the silicate composite particles are mixed with a coal pitch, a petroleum pitch, a phenol resin, or the like, heating is performed for carbonization. In addition, a carbon black may be adhered to the surfaces of the silicate composite particles.

Process (iv)

A step of washing the silicate composite particles (the case in which the electrically conductive layers are provided on the surfaces thereof is included) may also be performed with an acid. For example, when the composite particles are washed with an acidic aqueous solution, a small amount of alkaline components which may be present on the surfaces of the composite particles can be dissolved and removed. As the acidic aqueous solution, for example, an aqueous solution of an inorganic acid, such as hydrochloric acid, hydrofluoric acid, sulfuric acid, nitric acid, phosphoric acid, or carbonic acid, or an aqueous solution of an organic acid, such as citric acid or acetic acid may be used. However, when the silicate phase contains a group 2 element, the washing of the composite particles with an acidic aqueous solution is not so much necessary.

Figure 1:
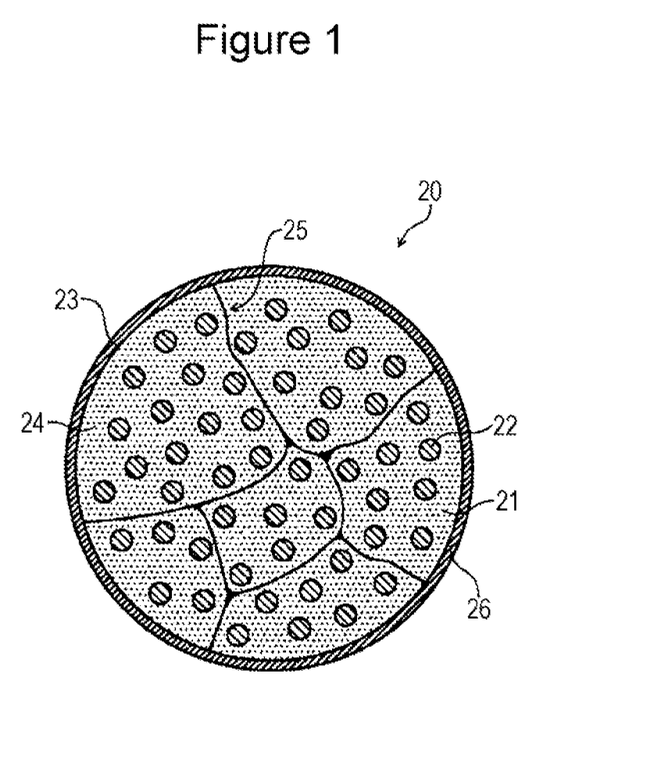
FIG. 1 is a cross-sectional view schematically showing a silicate composite particle according to one embodiment of the present disclosure.

FIG. 1 is a schematic cross-sectional view showing one example of a silicate composite particle 20. The silicate composite particle 20 generally includes a mother particle 23 which is a secondary particle formed by aggregation of a plurality of primary particles 24. The primary particles 24 each include a silicate phase 21 and silicon particles 22 dispersed in the silicate phase 21. The mother particle 23 has sea-island structures each of which includes the silicate phase 21 and the fine silicon particles 22 dispersed in the matrix thereof. The silicon particles 22 are approximately uniformly dispersed in the silicate phase 21. In the silicate composite particle, voids are hardly observed, and the void rate is at most less than 5 percent by volume or less.

In the mother particle 23, at at least a part of the interface between adjacent primary particles 24, a carbon region 25 can exist. The carbon region 25 contains, as a primary component, a residue of the organic solvent used in the manufacturing step (b) of the silicate composite particles. The carbon region 25 suppresses a decrease in ion conductivity of the silicate composite particle and, in addition, contributes to release of a stress generated in the silicate phase in association with the expansion and the contraction of the silicon particles in charge/discharge.

The silicate composite particle 20 further includes an electrically conductive material (electrically conductive layer 26) which covers at least a part of the surface of the mother particle 23. In this case, an end portion of the carbon region 25 at a surface side of the mother particle 23 is preferably in contact with the electrically conductive layer 26. Accordingly, a preferable electrically conductive network is formed from the surface to the inside of the mother particle 23.

The silicate phase 21 and the silicon particle 22 are each formed by aggregation of fine particles. The silicate phase 21 may be formed from particles finer than those for the silicon particle 22. In this case, in an X-ray diffraction (XRD) pattern of the silicate composite particle 20, the ratio of the integrated value of the diffraction peak of each of all the other elements to the integrated value of the diffraction peak which belongs to the (111) plane of single Si is, for example, 0.5 or less.

In order to increase the capacity and to improve the cycle characteristics, the content of the silicon particles 22 (single Si) occupied in the mother particle 23 measured by Si-NMR is preferably 20 to 95 percent by mass and more preferably 35 to 75 percent by mass. Accordingly, a high charge/discharge capacity can be ensured.

The mother particle 23 may contain other components besides the silicate phases 21, the silicon particles 22, and the carbon regions 25. For example, the silicate composite particle 20 may contain a small amount of crystalline or amorphous $SiO_2$. However, the content of $SiO_2$ occupied in the mother particle 23 measured by Si-NMR is preferably, for example, less than 7 percent by mass. In addition, in order to improve the strength of the mother particle 23, a reinforcing material, such as an oxide including $Zro_2$ or a carbide functioning as the carbon region 25, may be contained at less than 10 percent by mass with respect to the mother particle 23.

Since containing K and Li, the silicate phase 21 has a composition which is not likely to cause phase splitting. When the phase splitting once occurs, crystallization is liable to occur, and when crystals are generated, the fluidity of the silicate phase is degraded. Hence, no phase splitting preferably occurs.

The average particle diameter of the primary particles 24 is, for example, 0.2 to 10 μm and is preferably 2 to 8 μm. Accordingly, the stress caused by the volume change of the silicate composite particles in association with charge/discharge is more likely to be released, and preferable cycle characteristics are likely to be obtained. In addition, since the surface area of the silicate composite particle becomes appropriate, a decrease in capacity by a sub-reaction with the electrolyte is also suppressed.

The average particle diameter of the primary particles 24 can be measured by observing the cross-section of the silicate composite particle using a SEM. In particular, the average particle diameter can be obtained by averaging the diameters of cross-sectional equivalent circles (circles each having the same area as the cross-sectional area of the primary particle) of arbitrary 100 primary particles 24.

The average particle diameter of the silicon particles 22 is, before an initial charge, 500 nm or less, preferably 200 nm or less, and more preferably 50 nm or less. When the silicon particles 22 are appropriately miniaturized, the volume change in charge/discharge is decreased, and the structural stability is improved. The average particle diameter of the silicon particles 22 can be measured by observing the cross-sections of the silicate composite particles using a SEM or a TEM. In particular, the average particle diameter can be obtained by averaging the maximum diameters of arbitrary 100 silicon particles 2.

Hereinafter, the negative electrode, the positive electrode, the electrolyte, and the separator of the secondary battery according to the embodiment of the present disclosure will be described.

[Negative Electrode]

The negative electrode includes, for example, a negative electrode collector and a negative electrode active material layer. The negative electrode active material layer contains a negative electrode active material. The negative electrode active material at least contains silicate composite particles. The negative electrode active material layer is formed on at least one surface of the negative electrode collector. The negative electrode active material layer may be formed on one surface of the negative electrode collector or may also be formed on each of two surfaces thereof. The negative electrode active material layer is formed such that a negative electrode slurry in which a negative electrode mixture is dispersed in a dispersion medium is applied on the surface of the negative electrode collector and then dried. A coating film thus dried may be rolled, if needed. The negative electrode mixture contains, as an essential component, the negative electrode active material, and, as an arbitrary component, may also contain a binding agent, an electrically conductive agent, a thickening agent, and/or the like.

The negative electrode active material may further contain another active material. As the another active material, for example, a carbonaceous active material which electrochemically occludes and releases lithium ions is preferably contained. Since the volume of the silicate composite particles is expanded and contracted in association with charge/discharge, when the rate of the silicate composite particles occupied in the negative electrode active material is increased, a contact failure between the negative electrode active material and the negative electrode collector is liable to occur in association with charge/discharge. On the other hand, since the silicate composite particles are used together with the carbonaceous active material, while a high capacity of the silicon particles is imparted to the negative electrode, excellent cycle characteristics can be achieved. The rate of the silicate composite particles to the total of the silicate composite particles and the carbonaceous active material is preferably, for example, 3 to 30 percent by mass. Accordingly, the increase in capacity and the improvement in cycle characteristics are likely to be simultaneously obtained.

As the carbonaceous active material, for example, a graphite, a graphitizable carbon (soft carbon), or a non-graphitizable carbon (hard carbon) may be mentioned. Among those mentioned above, a graphite which is excellent in charge/discharge stability and which has a low irreversible capacity is preferable. The graphite indicates a material having a graphite type crystalline structure and may include a natural graphite, an artificial graphite, graphitized mesophase carbon particles, and the like. The carbonaceous active material may be used alone, or at least two types thereof may be used in combination.

As the negative electrode collector, for example, a poreless electrically conductive substrate (such as metal foil) or a porous electrically conductive substrate (such as a mesh, a net, or a punching sheet) may be used. As a material of the negative electrode collector, for example, there may be mentioned stainless steel, nickel, a nickel alloy, copper, or a copper alloy. Although not particularly limited, in consideration of the balance between the strength of the negative electrode and the reduction in weight thereof, the thickness of the negative electrode collector is preferably 1 to 50 µm and more preferably 5 to 20 µM.

The binding agent preferably contains, as at least a first resin, at least one selected from the group consisting of a polyacrylic acid, a polyacrylate salt, and derivatives thereof. As the polyacrylate salt, a Li salt or a Na salt is preferably used. In particular, a cross-linkable poly(lithium acrylate) is preferably used.

The content of the first resin in the negative electrode active material layer is preferably 2 percent by mass or less and more preferably 0.2 to 2 percent by mass.

A second resin may be used in combination with the first resin. As the second resin, for example, there may be mentioned a fluorine resin, such as a polytetrafluoroethylene or a poly(vinylidene fluoride) (PVDF); a polyolefin, such as a polyethylene or a polypropylene; a polyamide resin, such as an aramid resin; a polyimide resin, such as a polyimide or a poly(amide imide); a vinyl resin such as a poly(vinyl acetate); a poly(vinyl pyrrolidone); a poly(ether sulfone); or a rubber material, such as a styrene-butadiene copolymer (SBR). Those mentioned above may be uses alone, or at least two types thereof may be used in combination. The second resin may be an acrylic resin other than the first resin. As the acrylic resin other than the first resin, for example, there may be mentioned a poly(methyl acrylate), an ethylene-acrylic acid copolymer, a polyacrylonitrile, a poly(methacrylic acid), a poly(methacrylate salt), or a derivative thereof.

As the electrically conductive agent, for example, there may be mentioned a carbon black such as an acetylene black; electrically conductive fibers, such as carbon fibers or metal fibers; a carbon fluoride; a metal powder of aluminum or the like; electrically conductive whiskers of zinc oxide or potassium titanate; an electrically conductive metal oxide such as titanium oxide; or an organic electrically conductive material such as a phenylene derivative. Those mentioned above may be used alone, or at least two types thereof may be used in combination.

As the thickening agent, for example, there may be mentioned a cellulose derivative (including a cellulose ether), such as a carboxymethyl cellulose (CMC), a modified material thereof (including a salt, such as a Na salt), or a methylcellulose; a saponified product of a polymer, such as a poly(vinyl alcohol), having a vinyl acetate unit; or a polyether (such as a poly(alkylene oxide) including a poly(ethylene oxide)). Those mentioned above may be used alone, or at least two types thereof may be used in combination.

Although the dispersion medium is not particularly limited, for example, there may be mentioned water; an alcohol such as ethanol; an ether such as tetrahydrofuran; an amide such as dimethylformamide; N-methyl-2-pyrrolidone (NMP), or a mixed solvent thereof.

[Positive Electrode]

The positive electrode includes, for example, a positive electrode collector and a positive electrode active material layer formed on at least one surface of the positive electrode collector. The positive electrode active material layer is formed such that a positive electrode slurry in which a positive electrode mixture is dispersed in a dispersion medium is applied on the surface of the positive electrode collector and then dried. A coating film thus dried may be rolled, if needed. The positive electrode active material layer may be formed on one surface of the positive electrode collector or may also be formed on each of two surfaces thereof.

The positive electrode mixture contains, as an essential component, a positive electrode active material, and, as an arbitrary component, may also contain a binding agent, an electrically conductive agent, and/or the like.

As the positive electrode active material, a lithium composite metal oxide may be used. As the lithium composite metal oxide, for example, $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMePO_4$, or $Li_2MePO_4F$ may be mentioned. In the case described above, M is at least one selected from the group consisting of Na, Mg, Sc, Y, Mn, Fe, Co, Ni, Cu, Zn, Al, Cr, Pb, Sb, and B. Me includes at least one transition metal (such as at least one selected from the group consisting of Mn, Fe, Co, and Ni). $0 \leq a \leq 1.2$, $0 \leq b \leq 0.9$, and $2.0 \leq c \leq 2.3$ hold. In addition, the a value which indicates a molar ratio of lithium is a value in a discharge state and is increased and decreased by charge/discharge in accordance with a value immediately after the formation of the active material.

As the binding agent and the electrically conductive agent, materials similar to those described by way of example for the negative electrode may also be used. As the electrically conductive agent, a graphite, such as a natural graphite or an artificial graphite, may be used.

The shape and the thickness of the positive electrode collector may be selected from the shape and the thickness range, respectively, in accordance with the negative electrode collector. As a material of the positive electrode collector, for example, stainless steel, aluminum, an aluminum alloy, or titanium may be mentioned.

[Electrolyte]

The electrolyte contains a solvent and a lithium salt dissolved in the solvent. The concentration of the lithium salt in the electrolyte is, for example, 0.5 to 2 mol/L. The electrolyte may also contain a known additive.

As the solvent, an aqueous solvent or a nonaqueous solvent may be used. As the nonaqueous solvent, for example, a cyclic carbonate ester, a chain carbonate ester, or a cyclic carboxylate ester may be used. As the cyclic carbonate ester, for example, propylene carbonate (PC) or ethylene carbonate (EC) may be mentioned. As the chain carbonate ester, for example, diethyl carbonate (DEC), ethyl methyl carbonate (EMC), or dimethyl carbonate (DMC) may be mentioned. As the cyclic carboxylate ester, for example, γ-butyrolactone (GBL) or γ-valerolactone (GVL) may be mentioned. The nonaqueous solvent may be used alone, or at least two types thereof may be used in combination.

As the lithium salt, for example, a lithium salt (such as $LiClO_4$, $LiAlCl_4$, or $LiB_{10}Cl_{10}$) of an acid containing chlorine, a lithium salt (such as $LiPF_6$, $LiBF_4$, $LiSbF_6$, $LiAsF_6$, $LiCF_3SO_3$, or $LiCF_3CO_2$) of an acid containing fluorine, a lithium salt (such as $(LiN(SO_2F)_2$, $LiN(CF_3SO_2)_2$, $LiN(CF_3SO_2)(C_4F_9SO_2)$, or $LiN(C_2F_5SO_2)_2$) of an imide containing fluorine, or a lithium halide (such as LiCl, LiBr, or LiI) may be used. The lithium salt may be used alone, or at least two types thereof may be used in combination.

[Separator]

In general, the separator is provided between the positive electrode and the negative electrode. The separator has a high ion permeability, an appropriate mechanical strength, and an appropriate insulating property. As the separator, a fine porous thin film, a woven cloth, or a non-woven cloth may be used. As a material of the separator, for example, a polyolefin, such as a polypropylene or a polyethylene, may be used.

As one example of the structure of the secondary battery, a structure in which an electrolyte and an electrode group formed by winding a positive electrode, a negative electrode, and at least one separator are received in an exterior package may be mentioned. Instead of the winding type electrode group, a laminate type electrode group in which positive electrodes and negative electrodes are laminated with separators interposed therebetween may also be used. In addition, an electrode group having another structure may also be used. The secondary battery may have any shape, such as a cylindrical type, a square type, a coin type, a button type, or a laminate type.

Figure 2:
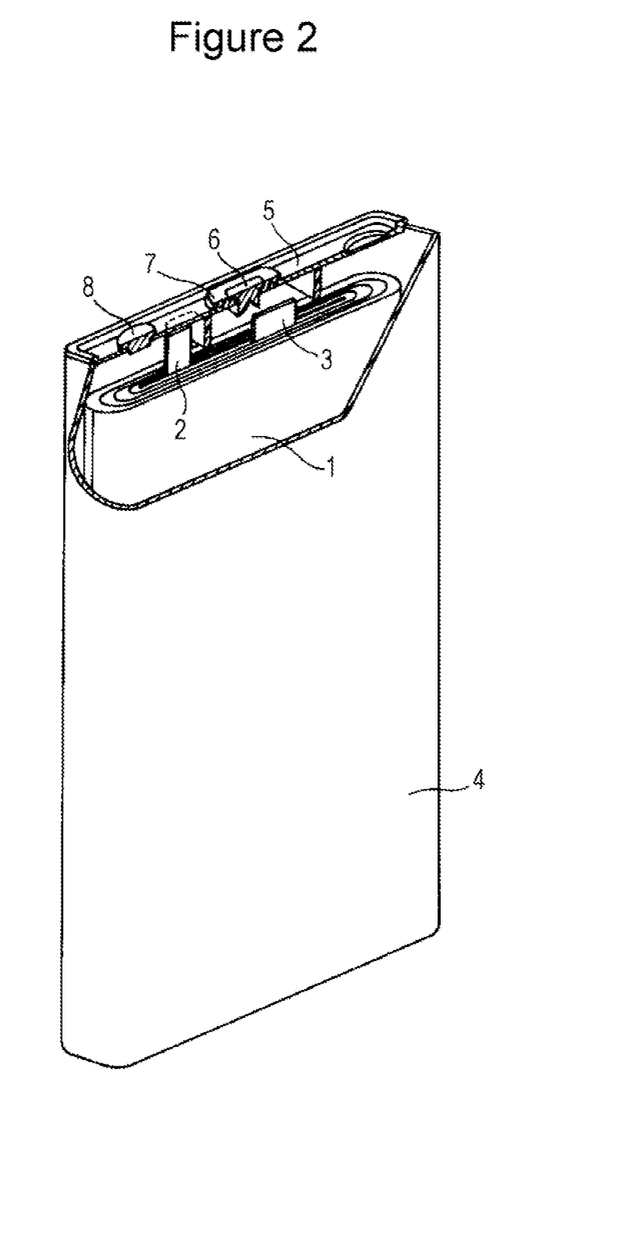
FIG. 2 is a partially notched perspective view of a secondary battery according to one embodiment of the present disclosure.

FIG. 2 is a partially notched schematic perspective view of a square secondary battery according to one embodiment of the present disclosure. The battery includes a bottom-closed square battery case 4, an electrode group 1 and an electrolyte (not shown) received in the battery case 4, and a sealing plate 5 which seals an opening of the battery case 4. The electrode group 1 includes a long belt-shaped negative electrode, a long belt-shaped positive electrode, and separators interposed therebetween. The negative electrode, the positive electrode, and the separators are wound around a flat winding core, and when the winding core is removed, the electrode group 1 is formed. The sealing plate 5 has a liquid charge port sealed with a sealing plug 8 and a negative electrode terminal 6 insulated from the sealing plate 5 by a gasket 7.

To a negative electrode collector of the negative electrode, one end of a negative electrode lead 3 is fitted by welding or the like. To a positive electrode collector of the positive electrode, one end of a positive electrode lead 2 is fitted by welding or the like. The other end of the negative electrode lead 3 is electrically connected to the negative electrode terminal 6. The other end of the positive electrode lead 2 is electrically connected to the sealing plate 5. At an upper portion of the electrode group 1, a resin-made frame body is disposed so as to separate not only between the electrode group 1 and the sealing plate 5 but also between the negative electrode lead 3 and the battery case 4.

Hereinafter, although the present invention will be described with reference to examples and comparative examples, the present invention is not limited to the following examples.

Example 1

[Preparation of Silicate Composite Particles]

Process (i)

Potassium carbonate, lithium carbonate, and silicon dioxide were mixed to have a molar ratio K/Li/Si of 50/7.1/42.9, so that a raw material mixture was obtained. The raw material mixture was melted by heating at 1,500° C. for 5 hours in an inert atmosphere, and a molten liquid was allowed to pass through metal rollers to form flakes, so that a silicate containing K, Li, and Si was obtained. The silicate thus obtained was pulverized to have an average particle diameter of 10 μm.

Process (ii)

The silicate having an average particle diameter of 10 μm and a silicon raw material (3N, average particle diameter: 10 μm) were mixed together to have a mass ratio of 50:50. After the mixture was charged in a pot (formed from SUS, volume: 500 mL) of a planetary ball mill (manufactured by Fritsch, P-5), and 24 SUS-made balls (diameter: 20 mm) were also charged in the pot, the pot was lidded, and a pulverization treatment was performed on the mixture at 200 rpm for 25 hours. In addition, to the mixture charged in the pot, ethanol was added as an organic solvent. The addition amount of the ethanol was set to 0.016 parts by mass with respect to 100 parts by mass of the mixture of the silicate and the silicon raw material.

Subsequently, after the mixture of the silicate and the silicon raw material was recovered, firing was performed at 600° C. for 4 hours in an inert atmosphere while the mixture was pressurized, so that a sintered body of the silicate was obtained.

Process (iii)

Subsequently, after the sintered body was pulverized into silicate composite particles and was allowed to pass through a 40-μm mesh, a coal pitch (manufactured by JFE Chemicals Corporation, MCP250) was mixed therewith, and a mixture of the silicate composite particles and the pitch was fired at 800° C. for 5 hours in an inert atmosphere to cover the surfaces of the composite particles with an electrically conductive carbon, so that electrically conductive layers were formed. The covering amount of the electrically conductive layer was set to 5 percent by mass with respect to the total mass of the composite particle and the electrically conductive layer. Next, by using a sieve, particles (silicate composite particles A1) which had an average particle diameter of 10 μm and which included the silicate composite particles and the electrically conductive layers formed on the surfaces thereof were classified. The thickness of the electrically conductive layer was estimated to approximately 200 nm.

Process (iv)

Subsequently, after the sintered body was pulverized into silicate composite particles and was allowed to pass through a 40-μm mesh, a coal pitch (manufactured by JFE Chemicals Corporation, MCP250) was mixed therewith, and a mixture of the silicate composite particles and the pitch was fired at 800° C. for 5 hours in an inert atmosphere to cover the surfaces of the composite particles with an electrically conductive carbon, so that electrically conductive layers were formed. The covering amount of the electrically conductive layer was set to 5 percent by mass with respect to the total mass of the composite particle and the electrically conductive layer. Next, by using a sieve, particles which had an average particle diameter of 10 μm and which included the silicate composite particles and the electrically conductive layers formed on the surfaces thereof were classified. The thickness of the electrically conductive layer was estimated to approximately 200 nm.

Examples 2 to 12

Except for that a raw material mixture was obtained by mixing materials together so that a molar ratio of each element had the rate shown in Table 1, silicate composite particles A2 to A12 were formed in a manner similar to that of Example 1.

Besides the potassium carbonate, the lithium carbonate, and the silicon dioxide, calcium carbonate, barium carbonate, zinc oxide, boron oxide, aluminum oxide, and phosphoric acid were also used.

Comparative Examples 1 to 4

Except for that a raw material mixture was obtained by mixing materials together so that a molar ratio of each element had the rate shown in Table 1, silicate composite particles B1 to B4 were formed in a manner similar to that of Example 1.

In Table 1, the silicate composite particles obtained in Examples 1 to 12 were called A1 to A12, respectively, and the silicate composite particles obtained in Comparative Examples 1 to 4 were called B1 to B4, respectively.

TABLE 1

| Sample | K Percent by mole | Li Percent by mole | Ca Percent by mole | Ba Percent by mole | Zn Percent by mole | B Percent by mole | Al Percent by mole |
|---|---|---|---|---|---|---|---|
| B1 | 47.8 | 0 | 2.6 | 0.7 | 1.5 | 11.5 | 1.5 |
| B2 | 57.1 | 0 | 0 | 0 | 0 | 0 | 0 |
| B3 | 0 | 57.1 | 0 | 0 | 0 | 0 | 0 |
| B4 | 0 | 47.8 | 2.6 | 0.7 | 1.5 | 1.5 | 1.5 |
| A1 | 50.0 | 7.1 | 0 | 0 | 0 | 0 | 0 |
| A2 | 7.1 | 50.0 | 0 | 0 | 0 | 0 | 0 |
| A3 | 25.9 | 25.9 | 0 | 0 | 0 | 0 | 0 |
| A4 | 23.1 | 23.1 | 1.5 | 0 | 0 | 0 | 0 |
| A5 | 23.1 | 23.1 | 7.7 | 0 | 0 | 0 | 0 |
| A6 | 23.1 | 23.1 | 1.5 | 0 | 7.7 | 0 | 0 |
| A7 | 21.4 | 21.4 | 1.4 | 0 | 0 | 0 | 0 |
| A8 | 17.7 | 17.7 | 2.8 | 0.8 | 1.6 | 1.6 | 1.6 |
| A9 | 23.9 | 23.9 | 2.6 | 0.7 | 1.5 | 1.5 | 1.5 |
| A10 | 40.3 | 7.5 | 2.6 | 0.7 | 1.5 | 1.5 | 1.5 |
| A11 | 14.9 | 32.8 | 2.6 | 0.7 | 1.5 | 1.5 | 1.5 |
| A12 | 7.5 | 40.3 | 2.6 | 0.7 | 1.5 | 1.5 | 1.5 |

| Sample | P Percent by mole | Si Percent by mole | K/Li Atomic ratio | Viscosity Poise | Crystallization rate | Void rate % | Cycle characteristics Index |
|---|---|---|---|---|---|---|---|
| B1 | 0 | 44.4 | — | 9.0 | 20 | 9.9 | 100 |
| B2 | 0 | 42.9 | — | 8.0 | 20 | 16.0 | 89 |
| B3 | 0 | 42.9 | 0 | 8.0 | 98 | 11.0 | 90 |
| B4 | 0 | 44.4 | 0 | 8.0 | 95 | 13.0 | 89 |
| A1 | 0 | 42.9 | 7.04 | 7.2 | 20 | 3.0 | 120 |
| A2 | 0 | 42.9 | 0.14 | 7.0 | 55 | 2.0 | 120 |
| A3 | 0 | 48.1 | 1.00 | 6.9 | 5 | 2.0 | 124 |
| A4 | 0 | 52.3 | 1.00 | 5.8 | 10 | 1.5 | 135 |
| A5 | 0 | 46.2 | 1.00 | 6.8 | 10 | 1.0 | 120 |
| A6 | 0 | 44.6 | 1.00 | 6.9 | 5 | 2.1 | 124 |
| A7 | 14.3 | 41.4 | 1.00 | 6.8 | 10 | 1.4 | 130 |
| A8 | 0 | 56.2 | 1.00 | 6.7 | 0 | 2.0 | 134 |
| A9 | 0 | 44.4 | 1.00 | 6.5 | 0 | 1.0 | 138 |
| A10 | 0 | 44.4 | 5.37 | 7.0 | 10 | 3.5 | 118 |
| A11 | 0 | 44.4 | 0.45 | 6.5 | 0 | 1.0 | 134 |
| A12 | 0 | 44.4 | 0.19 | 7.5 | 40 | 2.1 | 132 |

[Formation of Negative Electrode]

The silicate composite particles provided with the electrically conductive layers and a graphite were mixed at a mass ratio of 5:95, and this mixture was used as a negative electrode active material. After water was added to a negative electrode mixture containing the negative electrode active material, a sodium carboxymethyl cellulose (CMC-Na), a styrene-butadiene rubber (SBR), and a poly(lithium acrylate) salt at a mass ratio of 96.5:1:1.5:1, stirring was performed using a mixer (manufactured by PRIMIX Corporation, T.K. Hivis Mix) to prepare a negative electrode slurry. Next, after the negative electrode slurry was applied on surfaces of copper foil in an amount of 190 g/m$^2$, and coating films thus formed were dried, rolling was performed, so that a negative electrode in which negative electrode active material layers each having a density of 1.5 g/cm$^3$ were formed on the two surfaces of the copper foil was formed.

[Formation of Positive Electrode]

After N-methyl-2-pyrolidone (NMP) was added to a positive electrode mixture containing lithium cobalt oxide, an acetylene black, and a poly(vinylidene fluoride) at a mass ratio of 95:2.5:2.5, stirring was performed using a mixer (manufactured by PRIMIX Corporation, T.K. Hivis Mix) to prepare a positive electrode slurry. Next, after the positive electrode slurry was applied on surfaces of aluminum foil, and coating films thus formed were dried, rolling was performed, so that a positive electrode in which positive electrode active material layers each having a density of 3.6 g/cm$^3$ were formed on the two surfaces of the aluminum foil was formed.

[Preparation of Electrolyte Liquid]

In a mixed solvent containing ethylene carbonate (EC) and diethylene carbonate (DEC) at a volume ratio of 3:7, LiPF$_6$ was dissolved at a concentration of 1.0 mol/L, so that an electrolyte liquid was formed.

[Formation of Secondary Battery]

Tabs were fitted to the respective electrodes, and the positive electrode and the negative electrode were spirally wound with the separators interposed therebetween so that the tabs were each located at an outermost circumferential portion, so that an electrode group was formed. After the electrode group was inserted into an aluminum laminate film-made exterior package and then vacuum-dried at 105° C. for 2 hours, the electrolyte liquid was charged, and an opening of the exterior package was sealed, so that a secondary battery was obtained.

In Table 1, batteries obtained using the particles A1 to A12 and the particles B1 to B4 were also called A1 to A12 and B1 to B4, respectively, in a manner similar to that described above.

[Analysis of Silicate Composite Particle]

(a) Cross-Sectional Observation

When a cross-section of the silicate composite particle was observed using a scanning electron microscope (SEM), it was confirmed that the silicate composite particle was composed of a secondary particle formed from aggregated primary particles (average particle diameter: 3 μm). In addition, it was also confirmed that in a matrix of an oxide phase containing Na, Li, and Si, silicon particles having an average particle diameter of 50 nm were approximately uniformly dispersed.

(b) Quantitative Determination of Elements Other than Si

The contents of K, B, and Al contained in the silicate phase and the content of Ca contained therein were quantified in accordance with JIS R3105 (1995) (analysis method of borosilicate glass) and JIS R3101 (1995) (analysis method of soda-lime glass), respectively. The contents of the other elements contained in the silicate phase were each calculated by an ICP atomic emission spectrometry (ICP-AES).

(c) Quantitative Determination of Si Element Forming Silicon Particles

A Si amount forming the silicon particles was quantified by Si-NMR.

(d) Quantitative Determination of Si Element Contained in Silicate Phase

From the total Si amount obtained in the above (b) by ICP-AES, the Si amount forming the silicon particles was subtracted, so that a rate of Si with respect to the total amount of the elements other than O contained in the silicate phase was obtained. In addition, the content of SiO$_2$ was less than the lower detection limit.

In all the examples, the analysis value of each element was not so much different from a charge rate show in Table 1.

(e) Crystallization Rate

The silicate (hereinafter, also referred to as "glass flakes" in some cases) in the form of flakes obtained in Process (i) was heated at 930° C. for 10 hours, so that a standard sample in which a crystallization rate of the silicate phase was 100% was obtained. After the standard sample was pulverized, by an X-ray diffraction method (XRD), a total value (A) of integrated values of all diffraction peaks in a 2θ range of 10° to 40° was obtained. In addition, after the glass flakes were heated at 600° C. for 5 hours and then pulverized, a total value (B) of integrated values of all diffraction peaks in a 2θ range of 10° to 40° was obtained by XRD. A rate of B with respect to A which was calculated by (B/A)×100 was regarded as the crystallization rate (%).

(f) Viscosity

The glass flakes were melted at 1,400° C. and then dripped on a metal surface for rapid cooling, so that glass cullet was formed. After the glass cullet was polished, cutting was performed, so that test pieces having a thickness of 5 to 8 mm and a diameter of 20 to 30 mm were obtained. Subsequently, the test piece was set in a wide-range viscometer, and while the temperature was increased at a rate of 5° C./min, a viscosity at 600° C. was calculated from a penetration depth of a ZrO$_2$ ball, a displacement between parallel plates of the viscometer after the ball penetration, and a rotation rate of the parallel plates after the displacement thereof.

[Initial Charge/Discharge]

After a constant current charge was performed on each battery at 25° C. and at a current of 1 It (800 mA) to a voltage of 4.2 V, a constant voltage charge was performed at a voltage of 4.2 V to a current of 1/20 It (40 mA). After a rest period for 10 minutes, a constant current discharge was performed at a current of 1 It (800 mA) to a voltage of 2.75 V.

After the initial discharge was performed, the battery was disassembled, the negative electrode was taken out, and by using a cross-section polisher (CP), a cross-section of the negative electrode active material layer was obtained. From a cross-sectional image of the negative electrode active material layer by a SEM, 10 silicate composite particles each having a maximum diameter of 5 μm or more were randomly selected, and an image analysis was performed on each particle, so that an area rate (void rate) of the voids occupied in the cross-section of the composite particle was obtained. In this case, the measured values of the 10 composite particles were averaged. In addition, the image analysis was performed in a region of the composite particle from a point apart from the circumferential edge of the cross-section by 1 μm to the inside.

Next, a SEM-EDX analysis of the negative electrode active material layer was performed on A12. A ratio: I(K/O) of an intensity which belonged to K to an intensity which belonged to O was 0.05. In the SEM-EDX analysis, beams having an area of 1 μm square were applied to a particle central portion of the silicate composite particle having a particle diameter of approximately 10 μm.

[Charge/Discharge Cycle Test]

Charge and discharge were repeatedly performed under the following conditions.

<Charge>

A constant current charge was performed at 25° C. and at a current of 1 It (800 mA) to a voltage of 4.2 V, and subsequently, a constant voltage charge was performed at a voltage of 4.2 V to a current of 1/20 It (40 mA).

<Discharge>

A constant current discharge was performed at 25° C. and at a current of 1 It (800 mA) to a voltage of 2.75 V.

A rest period between the charge and the discharge was set to 10 minutes. A rate of a discharge capacity at a 100th cycle to a discharge capacity at a first cycle was regarded as a cycle maintenance rate, the number of cycles of Comparative Example 1 was set to 100, and the others were normalized. When the cycle maintenance rate is 100 or more, the cycle characteristics were evaluated as good. The evaluation results are shown in Table 1.

From Table 1, it is understood that since K and Li are used in combination, the crystallization of the silicate phase is suppressed, and the viscosity of the silicate in a molten state is decreased. As a result, the void rate of the silicate composite particle is significantly reduced, and hence, the cycle maintenance rate is remarkably improved.

Since K, Li, and Ca are used in combination, the void rate is further reduced, and the cycle maintenance rate tends to be increased. Furthermore, since an appropriate amount (in particular, each 5 percent by mole or less) of the element M is contained, the cycle maintenance rate also tends to be increased.

INDUSTRIAL APPLICABILITY

According to the present disclosure, a secondary battery having a high capacity and preferable cycle characteristics can be provided. The secondary battery according to the present disclosure is useful as a main power source of a mobile communication device, a portable electronic device, and the like.

REFERENCE SIGNS LIST 1 electrode group
2 positive electrode lead
3 negative electrode lead
4 battery case
5 sealing plate
6 negative electrode terminal
7 gasket
8 sealing plug
20 LSX particle
21 silicate phase
22 silicon particle
23 mother particle
24 primary particle
25 carbon region
26 electrically conductive layer

The invention claimed is:

1. A negative electrode active material for a secondary battery, comprising: silicate composite particles each of which contain a silicate phase and silicon particles dispersed in the silicate phase,
wherein the silicate phase is an oxide phase which contains Si, O, and alkali metals,
the alkali metals include at least K and Li,
wherein an atomic ratio: K/Li of K to Li contained in the silicate phase is 0.1 to 7.1, and
wherein, with respect to a total amount of elements other than O contained in the silicate phase,
a content of K is 7 percent by mole or more,
a content of Li is 7 percent by mole or more, and
a total content of Li and K is 70 percent by mole or less.

2. The negative electrode active material according to claim 1,
wherein the silicate phase further contains a group 2 element, and
a content of the group 2 element with respect to a total amount of elements other than O contained in the silicate phase is 20 percent by mole or less.

3. The negative electrode active material according to claim 1,
wherein the silicate phase further contains an element M, and
the element M is at least one selected from the group consisting of B, Al, Zr, Nb, Ta, La, V, Y, Ti, P, Bi, Zn, Sn, Pb, Sb, Co, Er, F, and W.

4. The negative electrode active material according to claim 1,
wherein, in an X-ray diffraction pattern of the silicate composite particles, a ratio of an integrated value of a diffraction peak of each of all the other elements to an integrated value of a diffraction peak which belongs to the (111) plane of single Si is 0.5 or less.

5. The negative electrode active material according to claim 1,
wherein the silicate composite particles have a void rate of less than 5 percent by volume.

6. A secondary battery comprising: a positive electrode; a negative electrode; an electrolyte; and a separator provided between the positive electrode and the negative electrode,
wherein the negative electrode includes a collector and a negative electrode active material layer, and
the negative electrode active material layer contains the negative electrode active material according to claim 1.

7. The secondary battery according to claim 6,
wherein, in a SEM-EDX analysis of the negative electrode active material layer in a discharge state,
a ratio: I(K/O) of an intensity which belongs to K to an intensity which belongs to O is 0.01 to 0.4.

8. The secondary battery according to claim 6,
wherein, in a cross-sectional SEM-EDX analysis of the negative electrode active material layer in a discharge state,
a ratio: I(Ca/O) of an intensity which belongs to Ca to an intensity which belongs to O is 0.5 or less.

9. The negative electrode active material according to claim 1, wherein the total content of Li and K is from 35.4 percent by mole to 57.1 percent by mole.

10. A negative electrode active material for a secondary battery, comprising: silicate composite particles each of which contain a silicate phase and silicon particles dispersed in the silicate phase, wherein the silicate phase is an oxide phase which contains Si, O, and alkali metals,
the alkali metals include at least K and Li,
the silicate phase further contains a group 2 element, and
a content of the group 2 element with respect to a total amount of elements other than O contained in the silicate phase is from 1.4 percent by mole to 7.7 percent by mole.

11. A negative electrode active material for a secondary battery, comprising: silicate composite particles each of which contain a silicate phase and silicon particles dispersed in the silicate phase,
wherein the silicate phase is an oxide phase which contains Si, O, and alkali metals,
the alkali metals include at least K and Li,
the silicate phase further comprising Ca in an amount from 1.4 percent by mole to 7.7 percent by mole with respect to a total amount of elements other than O contained in the silicate phase.

* * * * *